UNITED STATES PATENT OFFICE.

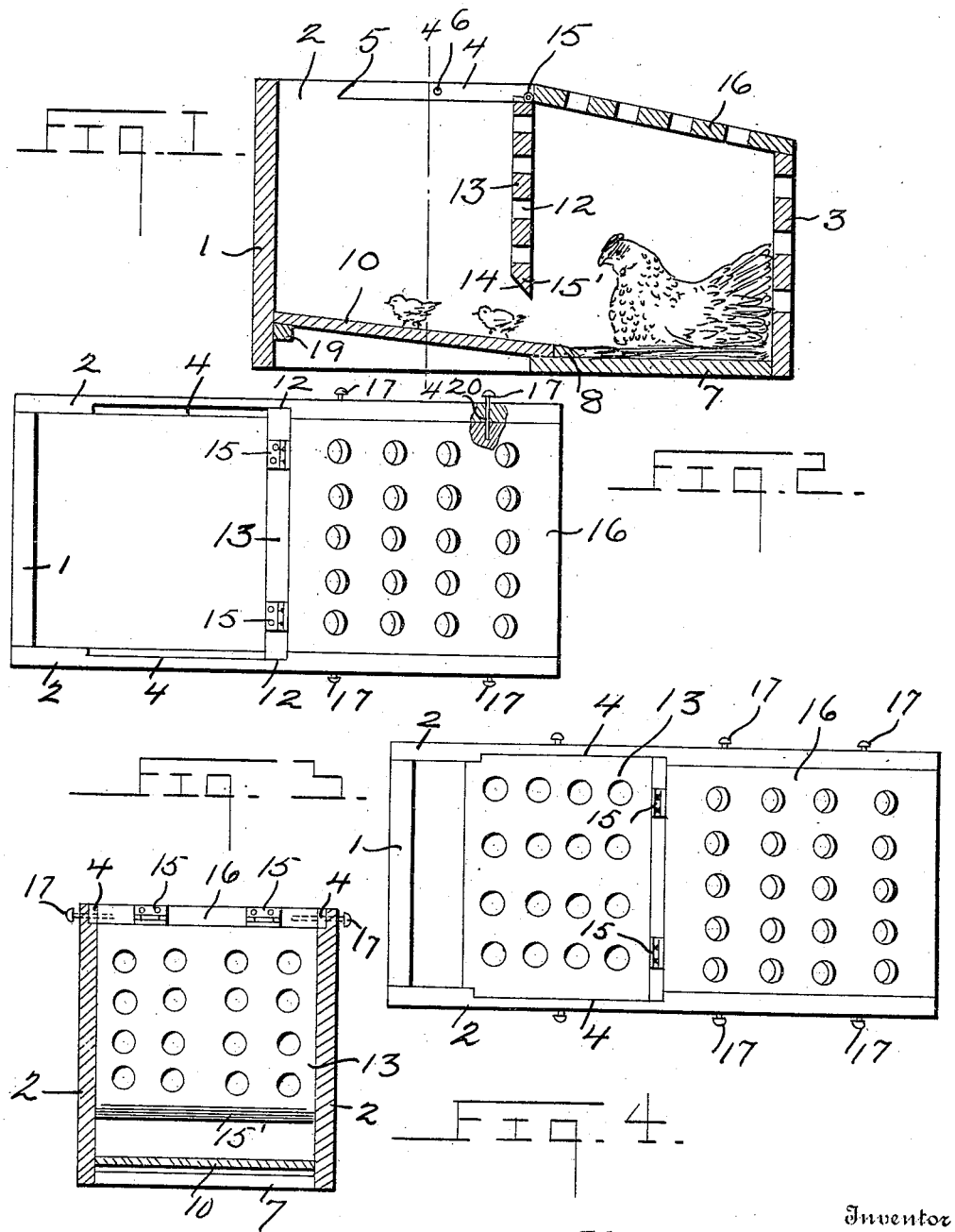

HENRY BOETTCHER, OF RAYMOND, MINNESOTA.

INTERCHANGEABLE HEN'S NEST.

946,323.

Specification of Letters Patent.    Patented Jan. 11, 1910.

Application filed July 10, 1909. Serial No. 506,876.

*To all whom it may concern:*

Be it known that I, HENRY BOETTCHER, a citizen of the United States, residing at Raymond, in the county of Kandiyohi and State of Minnesota, have invented certain new and useful Improvements in Interchangeable Hens' Nests, of which the following is a specification.

This invention has relation to certain new and useful improvements in poultry appliances and comprises an interchangeable hen's nest.

The primary object of my invention is to provide a hen's nest constructed so that the eggs as soon as laid will gravitate into a closed compartment, preventing the eggs being broken or eaten by egg-eating hens.

Another object is to provide a hen's nest so constructed that the same may be easily converted into a coop.

Another object is to provide a nest constructed so that the same may be made to serve as a protected chick run while confining a brooding hen.

A still further object is to provide an interchangeable hen's nest arranged in such a manner that the same may be readily cleaned and shipped and packed in a knocked-down condition.

With these and other objects in view, the present invention consists in the combination and arrangement of parts as will be hereinafter more fully described and particularly pointed out in the appended claim, it being understood that changes in the specific structure shown and described may be made within the scope of the claim without departing from the spirit of the invention.

In the drawings forming a part of this specification, and in which like numerals of reference indicate similar parts in the several views, Figure 1 shows a longitudinal sectional view of a nest constructed according to my invention. Fig. 2 shows a top view of the device as used as a nest. Fig. 3 shows the device as arranged when used as a coop. Fig. 4 is a section on line 4—4 of Fig. 1.

In poultry culture it is quite essential to have a handy interchangeable device which may be used for different purposes so that when the device is not in use for one purpose, the same may be used for another.

In my present invention I provide a hen's nest having two compartments so that the eggs after having been laid will roll from the nest into a closed compartment thus preventing the eggs being broken or eaten by an egg-eating hen. The nest is further so constructed that should it be desired to temporarily coop a moulting hen or a fowl for fattening purposes, the same can instantly be converted to a coop. The device is further so arranged that after the nest has been used by a sitting hen, the same can be arranged to serve as a brooder, to protect the hen as well as the chicks against hawks, cats and the like.

In the accompanying drawings, the numeral 1 designates the front of the nest, 2 the two similar sides and 3 the ventilated back. The front and sides are preferably imperforate. The back 3, as shown, does not extend the full width of the sides 2, and held between these sides 2 and against the back 3, is the bottom 7 which approximately covers one-half of the floor area of the nest, as clearly disclosed in Fig. 1. Each side member 2 is provided with a vertically disposed groove 12 which below ends in a mitered termination 14 which serves as a stop to the beveled end 15', of the partition 13 which is preferably provided with ventilating openings, as disclosed. As shown in Fig. 1, this partition 13 does not extend downward the full width of the side members 2, but ends short of the bottom 7, so as to provide an escape way or opening of a size large enough to permit an ordinary sized egg rolling through the same. Communicating with the vertically disposed groove 12 are the edge grooves 4 which end in the mitered sockets 5 also arranged to form a stop for the beveled edge 15' of the partition 13.

Secured to the partition 13 by means of the hinges 15, is the ventilated top 16 this top being arranged to be snugly held between the side members 2 and upon the ventilated back 3. As disclosed in Fig. 2, the partition 13 is slightly wider than the top 16 as this partition is held within the grooves 12.

Secured to the bottom 7, is the stop cleat 8 while secured to the front 1 at a height slightly above the stop cleat 8 is the supporting cleat 9 and held upon this supporting cleat 9 and against the stop cleat 8 is the inclined bottom 10 so arranged that any round article held within the forward compartment of the nest will gravitate into the rear compartment closed by means of the ventilated top 16.

In Fig. 1 I have shown the nest as arranged for laying purposes. The hens can readily reach the front compartment and the egg laid therein will gravitate into the rear compartment. Should the nest be used as a brooder in connection with a hen and her chicks, the hen would be placed within the rear compartment in which instance the lid 16 would be secured by means of the pins 17 passing through openings 20 within the side members 2 and entering the lid 16. These pins may be in the form of wire nails, and assist in holding the lid to the nest. The chicks will then be permitted to run out upon the forward inclined bottom 10. As the chicks grow older and it is desired that they should be provided with a grass run, the bottom 10 is removed so that the forward portion of the nest will have an uncovered bottom. Should it be desired to use the nest as a coop, the operator withdraws the partition 13 and places the same upon the edge grooves 4, so that the lower mitered end 15' is stopped against the edge 5 when two pins are inserted through the openings 6 within the forward portions of the side members to securely fasten the perforated partition 13 to the upper edge of the side members 2, in which condition the partition 13 and the lid 16 completely cover the nest structure, preventing any escape of the confined fowl.

The nest is preferably shipped in a knocked-down condition so that the shipping expenses will be reduced to a minimum. The nest is assembled in securing the front and back between the sides, and then properly fixing the bottom, as disclosed in Fig. 1.

The device is simple and inexpensive in construction and most durable and efficient in operation.

And having thus described my said invention what I claim as new and desire to secure by United States Letters Patent is:

In a device of the character described, the combination with two similar side members each being provided with a vertical groove and an upper edge groove, of a stub bottom of a length approximately half that of said sides, a front securing said sides, a ventilated back securing said sides and contacting with said bottom, a stop cleat carried by said bottom, a supporting cleat secured to said front, a bottom carried upon said supporting cleat and against said stop cleat in an inclined position, a ventilated partition having a beveled edge held within said vertical groove and arranged to be held within said upper edge groove and a ventilated top secured to said partition said top resting between said side members and upon said ventilated back, all arranged substantially as and for the purpose set forth.

In testimony whereof I affix my signature, in presence of two witnesses.

HENRY BOETTCHER.

Witnesses:
  ALO ABRAHAMSON,
  A. G. BARBKNECHT.